(12) United States Patent
Mundt et al.

(10) Patent No.: US 10,261,191 B2
(45) Date of Patent: Apr. 16, 2019

(54) HIGH RELIABILITY GNSS CORRECTION

(71) Applicant: Raven Industries, Inc., Sioux Falls, SD (US)

(72) Inventors: Clinton Howard Mundt, Leander, TX (US); Marc Roger Tibout, L'Ile-Bizard (CA); Joshua James Skanderup, Round Rock, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 435 days.

(21) Appl. No.: 14/644,968

(22) Filed: Mar. 11, 2015

(65) Prior Publication Data

US 2015/0260848 A1   Sep. 17, 2015

Related U.S. Application Data

(60) Provisional application No. 61/951,423, filed on Mar. 11, 2014.

(51) Int. Cl.
*G01S 19/07* (2010.01)

(52) U.S. Cl.
CPC .................... *G01S 19/07* (2013.01)

(58) Field of Classification Search
CPC .......... G01S 19/07; G01S 19/08; G01S 19/21; G01S 19/23; G01S 19/40; G01S 19/41; G01S 19/05; G01S 19/43; G01S 19/04; G01S 19/03; G01S 5/0027; B60N 2/2863; H04J 3/0685; H04J 3/0661; H04L 45/125; G05B 23/0278; G06Q 10/063; G06F 9/466
USPC .................................... 342/357.44
See application file for complete search history.

(56) References Cited

U.S. PATENT DOCUMENTS

| | | | | |
|---|---|---|---|---|
| 7,911,378 B2 * | 3/2011 | Zhang | ..................... | G01S 19/43 342/357.26 |
| 8,571,800 B2 * | 10/2013 | Fortune | ................... | G01S 19/43 702/14 |
| 8,786,491 B2 * | 7/2014 | Fischer | ................. | H04W 64/00 342/357.43 |

(Continued)

FOREIGN PATENT DOCUMENTS

| | | | | |
|---|---|---|---|---|
| EP | 2963437 A1 * | 1/2016 | ............. | G01S 19/09 |
| JP | 5638065 B2 * | 12/2014 | ................ | C08F 8/36 |

(Continued)

OTHER PUBLICATIONS

"International Application Serial No. PCT/US2015/019969, International Preliminary Report on Patentability dated Sep. 22, 2016", 8 pgs.

(Continued)

*Primary Examiner* — Vladimir Magloire
*Assistant Examiner* — Nuzhat Pervin
(74) *Attorney, Agent, or Firm* — Schwegman Lundberg & Woessner, P.A.

(57) ABSTRACT

Disclosed in some examples are methods, systems, and machine-readable mediums to collect Global Navigation Satellite System (GNSS) corrections reliably via multiple network links. In some examples, the GNSS corrections are obtained at a GNSS correction server via multiple network links. The GNSS corrections are processed at the GNSS correction server via a voting algorithm that determines the optimal instance of the GNSS correction to forward to the remote GNSS Client.

20 Claims, 4 Drawing Sheets

(56) References Cited

U.S. PATENT DOCUMENTS

| | | | | |
|---|---|---|---|---|
| 8,938,636 B1* | 1/2015 | Hochschild | ............ | H04J 3/0661 |
| | | | | 713/401 |
| 9,140,776 B2* | 9/2015 | Higgison | .............. | G01S 5/0027 |
| 9,569,253 B1* | 2/2017 | Hsieh | ....................... | G06F 9/466 |
| 2005/0060069 A1* | 3/2005 | Breed | .................. | B60N 2/2863 |
| | | | | 701/408 |
| 2006/0222019 A1* | 10/2006 | Hedin | ................... | H04J 3/0685 |
| | | | | 370/509 |
| 2007/0171936 A1* | 7/2007 | Hazra | ................... | H04L 45/125 |
| | | | | 370/465 |
| 2008/0222019 A1* | 9/2008 | Stanforth | ............. | G06Q 10/063 |
| | | | | 705/37 |
| 2008/0228338 A1* | 9/2008 | Howard | ............. | G05B 23/0254 |
| | | | | 701/31.4 |
| 2010/0013701 A1* | 1/2010 | Fischer | ................. | H04W 64/00 |
| | | | | 342/357.43 |
| 2010/0149026 A1* | 6/2010 | Farmer | ................... | G01S 19/05 |
| | | | | 342/357.31 |
| 2012/0116677 A1* | 5/2012 | Higgison | .............. | G01S 5/0027 |
| | | | | 701/518 |
| 2013/0293412 A1* | 11/2013 | Appleford | ............... | G01S 19/04 |
| | | | | 342/357.23 |
| 2014/0184442 A1* | 7/2014 | Large | ...................... | G01S 19/43 |
| | | | | 342/357.42 |
| 2014/0253374 A1* | 9/2014 | Tibout | .................... | G01S 19/04 |
| | | | | 342/357.42 |
| 2014/0292569 A1* | 10/2014 | Wallace | .................. | G01S 19/43 |
| | | | | 342/357.42 |
| 2014/0292570 A1* | 10/2014 | Wallace | .................. | G01S 19/41 |
| | | | | 342/357.42 |
| 2015/0334678 A1* | 11/2015 | MacGougan | ........... | G01S 19/22 |
| | | | | 701/451 |

FOREIGN PATENT DOCUMENTS

| | | | | |
|---|---|---|---|---|
| WO | WO-2010008682 A1 * | 1/2010 | ............. | G01S 19/03 |
| WO | WO-2010057149 A1 * | 5/2010 | ............. | G01S 19/05 |
| WO | WO-2015138606 A1 | 9/2015 | | |

OTHER PUBLICATIONS

"International Application Serial No. PCT/US2015/019969, International Search Report dated Jun. 26, 2015", 2 pgs.

"International Application Serial No. PCT/US2015/019969, Written Opinion dated Jun. 26, 2015", 6 pgs.

* cited by examiner

HIGH RELIABILITY GNSS CORRECTION

CLAIM OF PRIORITY

This patent application claims the benefit of priority to U.S. Provisional Application Ser. No. 61/951,423, filed on Mar. 11, 2014, which is hereby incorporated by reference herein in its entirety.

BACKGROUND

Global Navigation Satellite Systems (GNSS) allow devices to calculate their geospatial position based upon signals sent from GNSS satellites. Example GNSS' include the Global Positioning System (GPS), Globalnaya Navigatsionnaya Sputnikovaya Sistema (GLONASS), and Galileo. While the accuracy of a position calculated from a typical GNSS system is adequate for some tasks, greater accuracy is required for things like precision navigation applications such as machine guidance systems. Various techniques have been developed which use correction information to assist GNSS receiver devices to increase the accuracy of their positional calculations. One such example is Real Time Kinematics (RTK). In RTK systems, a device whose position is to be accurately determined (often called a "rover"), will use GNSS correction information sent from a nearby GNSS correction generation device (e.g., an RTK correction generation device—sometimes called an RTK "base station" or an RTK "reference station") to correct the geospatial location calculated from the GNSS system.

In some cases, the GNSS correction generation device is an on-site, or nearby device which wirelessly transmits the GNSS correction information directly to the rover. These on-site GNSS correction generation devices are typically expensive and must be setup prior to use. Furthermore, a rover must stay within range of the wireless transmission, which makes it unsuitable for precision navigation over longer distances.

In order to make GNSS correction information more accessible and easier to use, various entities have setup networks of GNSS correction generation devices. These networks feature numerous GNSS correction generation devices that transmit their corrections to a central server, typically transmitted via the internet or other network technology. The central server then provides the GNSS correction information over the Internet or other network to anyone subscribed. Rovers may contact the central server to receive the GNSS correction information. Typically, a rover uses a cellular network to connect to the central server.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
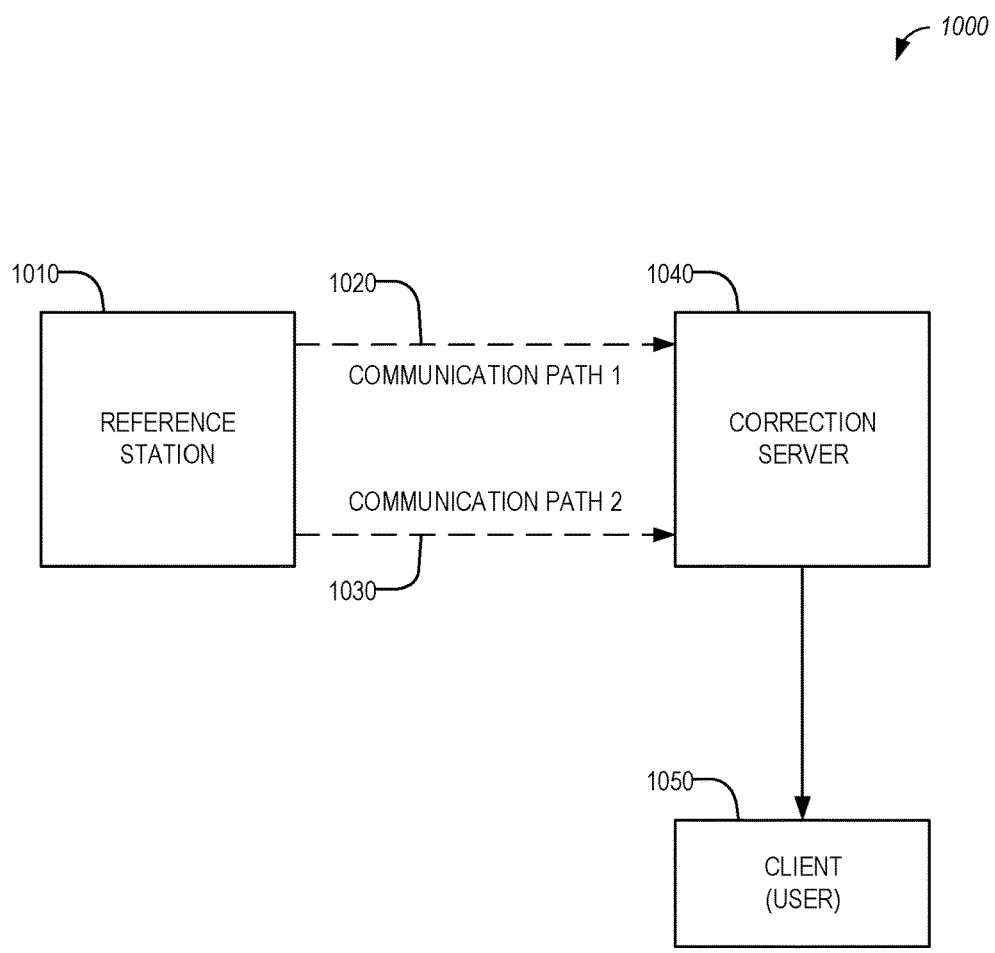
FIG. 1 shows an example single source and single client correction data message network.

Correction Sources create and send corrections via networks of various types and quality. Corruption of a single byte in a correction message will typically result in it being discarded by the client. The loss of a single correction message can adversely affect the overall usability of the corrections. The network can also introduce latency and/or inconsistency to the correction stream that can degrade system performance.

One method of addressing the unreliability of networks is to transmit correction messages from a reference station to a single server via two independent networks. However, the server may process and forward correction data from each correction message to each connected client, which may waste bandwidth on various networks or waste resources on the server or client.

Some existing solutions may use an internet protocol (IP) router to select from between or among two or more IP communication links. Some existing router solutions may use various selection criteria in selecting an IP communication link, and have been unreliable in selecting and conveying GNSS correction messages. The systems and methods described herein may use IP communication link selection criteria different from these routers, and may override the normal course of operation of these routers.

Disclosed in some examples are methods, systems, and machine-readable mediums to stream data efficiently using two or more independent network types. In order to overcome the aforementioned unreliability of networks, correction messages may be sent via two or more communication links. The use of at least two different communication links increases message transmission reliability by leveraging the reduced likelihood that the two different links will malfunction simultaneously. The independent IP communication links use different physical IP communication links. For example, a first communication link may be a cellular communication link and a second communication link may be a terrestrial communication link. The communication links may be WiFi, BLUETOOTH, GSM, LTE, LTE Advanced, Ethernet, or another type of communication link. A first type of communication link may be used between a correction source and a network, and the communication link between the network and a correction server may use the same type or a different type of communication link.

A correction server may receive various correction messages from one or more correction sources, and may use a voting algorithm to determine whether a correction message should be processed or relayed to a client. The server voting algorithm may be based on data within a correction message, based on additional data added to the correction message, based on an analysis or comparison of data within one or more correction messages, or based on other factors. Each reference station may add information to correction messages, where the added information includes various additional information, such as data integrity information or a timestamp. The additional information may be converted to binary format and added to the message, and may be referred to as a "binary adder." Using the added information, each server can process messages as they are received, discard any corrupted or redundant messages, and forward all valid messages to various clients.

While the specification describes GNSS correction data such as RTK data as the streamed data, one of ordinary skill in the art will appreciate that any data streaming application may use the techniques described herein. Data streaming applications may include streaming various data types, including video, audio, audio/video, Voice over IP (VOIP), or the like. Additionally, the term firewall may refer to a software- or hardware-based network security device that controls incoming and outgoing network traffic by applying a set of rules to the traffic.

FIG. 1 shows an example single source and single client correction data message network 1000. Reference station 1010 (e.g., reference station, RTK base station) generates one set of correction data, which is sent via redundant first and second communication links 1020 and 1030. For example, first communication link 1020 may use a wireless cellular communication, and second communication link 1030 may use wired terrestrial communication. Other communication links may be used, such as portions of the Internet, a cellular voice network, a local area network (LAN), a wide area network (WAN), satellite network, wireless point-to-point network (P2P) or other network. Correction data may be sent from reference station 1010 to the Correction Server 1040. The Correction Server 1040 may apply a voting algorithm to select which messages within the correction data are to be sent to the Client 1050.

The reference station 1010 may add information to the correction data message. The added information message may have consistent characteristics that enable efficient processing by the Correction Server 1040, such as having a consistent length or being located in a consistent position within the correction data message. The added information may include information about the correction protocol being used (e.g., RTCM, CMR+) the message type (e.g., GPS, GLONASS), or reference station diagnostics (e.g., number of visible satellites, status of receiver, receiver integrity monitoring). For example, reference station diagnostics may include Receiver Autonomous Integrity Monitoring (RAIM), which may compare redundant GNSS satellite pseudorange measurements to identify or recommend exclusion of faulty GNSS satellites. The Correction Server 1040 may extract each correction message received from the reference station 1010, compare reference station diagnostics, and may send all or part of a correction message to the Client 1050. The reference station 1010 may add an error-detecting code to the added information, such as cyclic redundancy check (CRC). The Correction Server 1040 may extract each correction message received from the reference station 1010 and verify the CRC code associated with each protocol to ensure that the message is correctly received, where any corrupted message may be discarded. The Correction Server 1040 may also interpret received correction data and may add information to the correction data message. For example, the Correction Server 1040 may generate or add reference station diagnostics or an error-detecting code to the correction data message.

The reference station 1010 may add a uniquely identifying timestamp to the added information. The timestamp may be an incrementing integer value. For example, the timestamp may be a GNSS timestamp, such as the GPS week-seconds. The timestamp may be used by the Correction Server 1040 to distinguish between or among correction messages received within a period, and thereby determine whether the correction message has been processed and sent to a Client 1050. The Correction Server 1040 may use the timestamp to determine which messages to convey. For example, the Correction Server 1040 may compare the current message timestamp to other timestamps that have been recently received. If the timestamp is later than the last distributed message for this type and protocol, then the correction message is sent to the Client 1050. Conversely, if the timestamp is earlier than or equal to a timestamp for a previously distributed message for this type and protocol, the correction message is not sent to the Client 1050. For example, if first communication link 1020 uses a wireless cellular communication with relatively high latency and second communication link 1030 uses a wired terrestrial communication with relatively low latency but an occasional CRC error, then Correction Server 1040 may use correction messages received through the slower first communication link 1020 whenever second communication link 1030 exhibits a CRC error. Similarly, if the first or second communication link 1020 or 1030 exhibits a variable latency, then the timestamp may enable a consistent processing and sending of correction messages. For example, if time of arrival (TOA) were used instead of a timestamp, then concurrently received messages may both be sent to the Client 1050. If the Client 1050 expects a consistent number of correction messages or has a communication throughput maximum, this schema may allow the Correction Server 1040 to discard any redundant or corrupted correction messages, ensuring consistent throughput and data integrity at the Client 1050.

Figure 2:
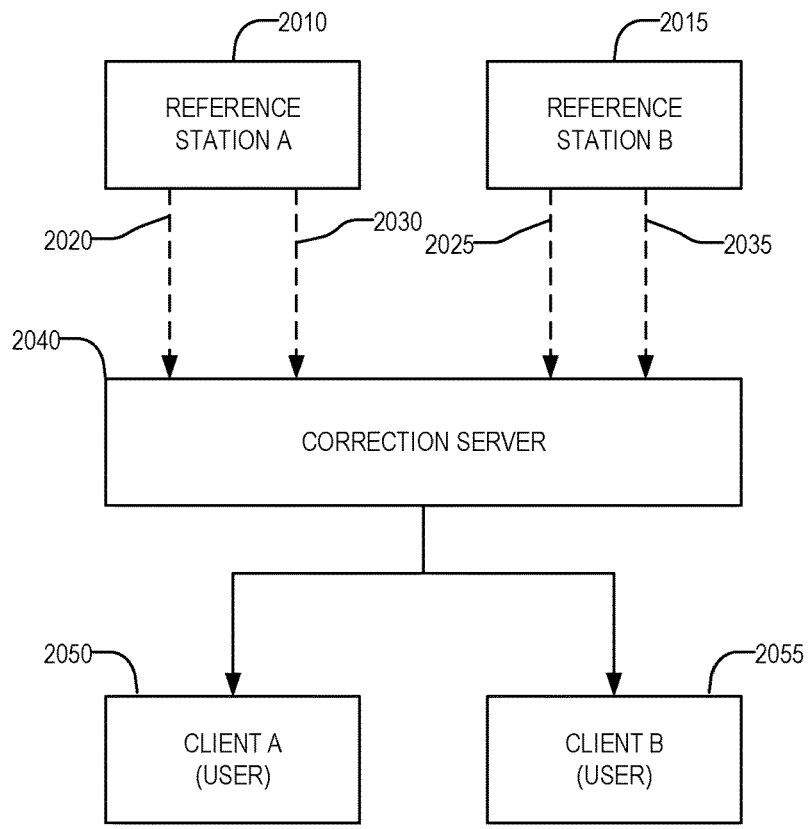
FIG. 2 shows an example two-source and two-client correction data message network.

FIG. 2 shows an example two-source and two-client correction data message network 2000. Each of Reference Station A 2010 and Reference Station B 2015 may generate different sets of correction data. Reference station A 2010 may send its correction data via redundant first and second communication links 2020 and 2030, and Reference Station B 2015 may send its correction data via redundant first and second communication links 2025 and 2035. Correction data may be sent from Correction Sources 2010 and 2015 to the Correction Server 2040. The Correction Server 2040 may apply the voting algorithm to select messages within the correction data that are to be sent to Client A 2050 and Client B 2055. For example, the most recent correction data message may be identified and sent, a portion of one correction data message may be sent, or various portions of multiple correction data messages may be sent.

The Correction Server 2040 may compare integrity, diagnostics, or other information from multiple sources, and may use the comparison to select messages or portions of messages to be forwarded to a client. The Correction Server 2040 may extract GNSS-specific data integrity information from Reference Station A 2010 and Reference Station B 2015, and may compare redundant GNSS satellite pseudorange measurements from multiple Correction Sources 2010 to identify or recommend exclusion of faulty GNSS satellites. For example, the Correction Server 2040 may identify a subset of faulty GNSS satellites, and may send only a portion of the correction data to a client. In another example, the Correction Server 2040 may compare the raw correction data from the reference stations, and may generate an inter-station integrity message to be sent to a client. The Correction Server 2040 may connect directly to Client A 2050 and Client B 2055 to deliver correction data, or the connection may be broadcast, multicast, or point-to-point.

While FIG. 2 shows a Correction Server 2040 separate from Reference Station A 2010 and Reference Station B 2015, one of ordinary skill in the art with the benefit of Applicants' disclosure will appreciate that Reference Station A 2010 or Reference Station B 2015 may be modified to support functionality similar to Correction Server 2040. For example, Reference Station A 2010 may send a correction message to Reference Station B 2015 through a communication link between the Reference Stations, and Reference Station B 2015 may apply the voting algorithm to select which messages within the correction data are to be sent to Client A 2050 and Client B 2055. Similarly, Correction Server 2040 may be modified to include Reference Station functionality, such as the ability to receive, process, or add data to GNSS data.

Figure 3:
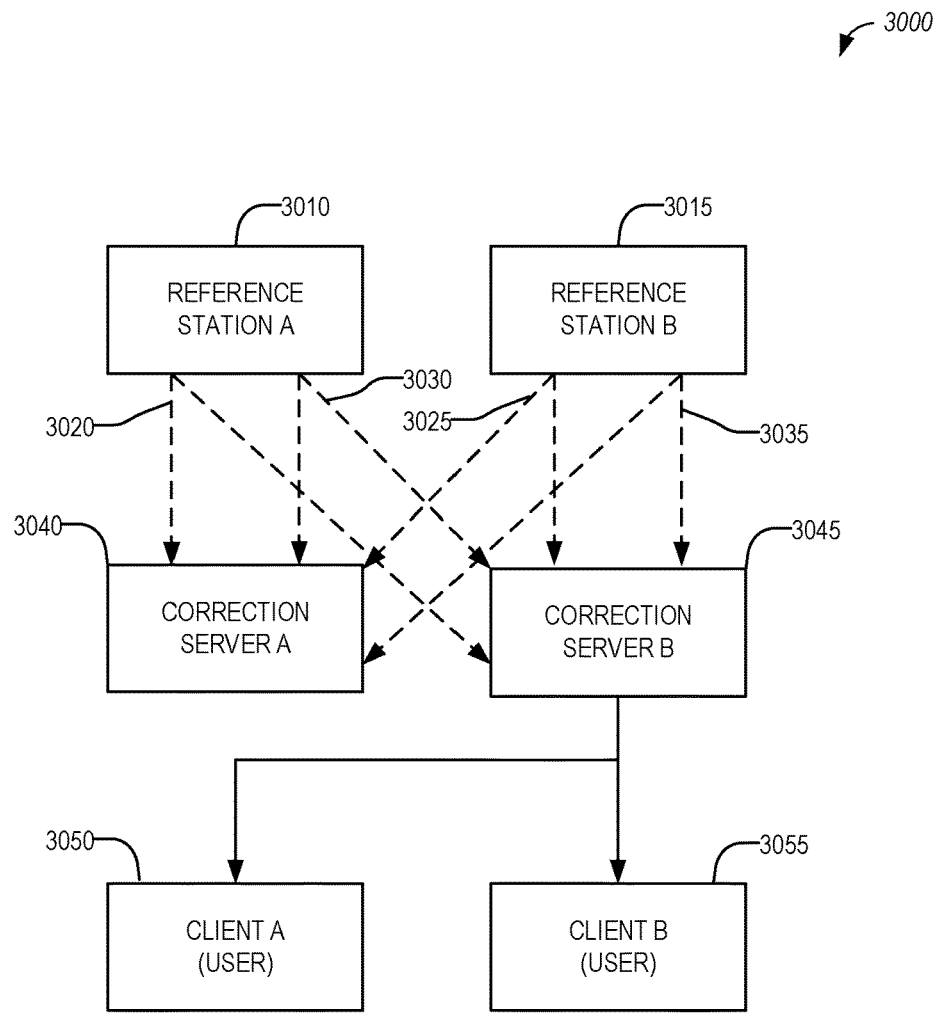
FIG. 3 shows an example two-source and two-server correction data message network.

FIG. 3 shows an example two-source and two-server correction data message network 3000. Multiple redundant servers may be used to ensure correction messages are processed and send to clients in the event of a server failure. Each of two Reference Station A 3010 and Reference Station B 3015 may generate different sets of correction data. Reference Station A 3010 may send its correction data via redundant first and second communication links 3020 and 3030 to Correction Server A 3040 and to Correction Server B 3045. Similarly, Reference Station B 3015 may send its correction data via redundant first and second communication links 3025 and 3035 to Correction Server A 3040 and to Correction Server B 3045. Both Correction Servers 3040 and 3045 may be used to process all messages received from both Correction Sources 3010 and 3015. One server may be identified as a backup server, and another server may be identified as a primary server. For example, Correction Server B 3045 may be designated as the primary server, and Correction Server A 3040 may be designated as a backup server. In the event that Correction Server B 3045 is unable to process or deliver correction data, Correction Server A 3040 may be designated as the primary server, and may apply the voting algorithm to select which messages within the correction data are to be sent to both Client A 3050 and Client B 3055. Redundant servers may use redundant communication links. For example, Correction Server A 3040 and Correction Server B 3045 may connect directly to Client A 3050 and Client B 3055 to deliver correction data, or the connection may be broadcast, multicast, or point-to-point.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may later access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 4:
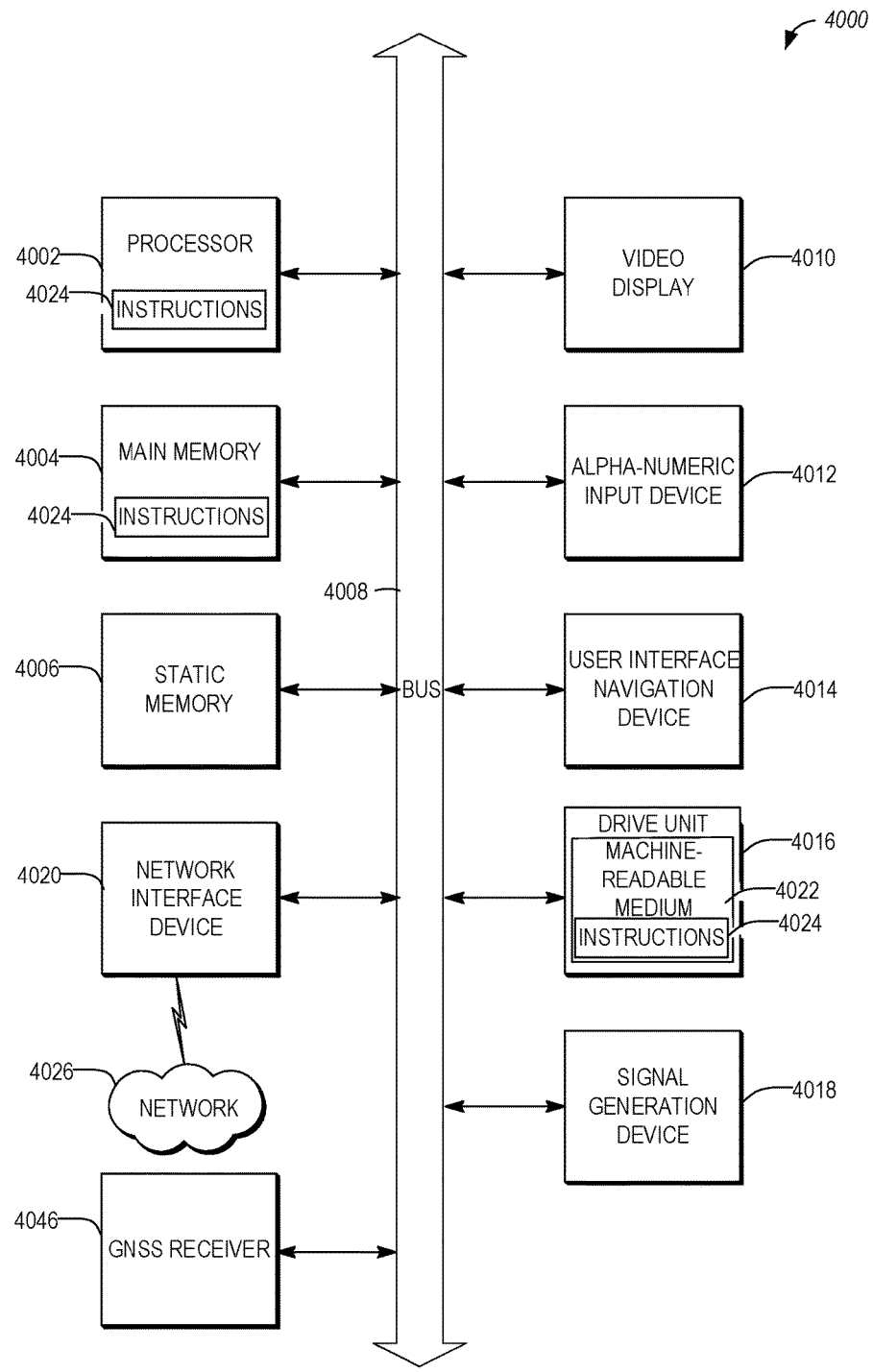
FIG. 4 shows a schematic of a machine according to some examples of the present disclosure.

FIG. 4 is a block diagram of machine in the example form of a computer system 4000 within which instructions, for causing the machine to perform any one or more of the methodologies discussed herein, may be executed. For example, any one of the components shown in FIGS. 1-3 may be or contain one or more of the components described in FIG. 4. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 4 or only a subset of the components shown in FIG. 4.

The example computer system 4000 includes a processor 4002 (e.g., a central processing unit (CPU), a graphics processing unit (GPU) or both), a main memory 4004 and a static memory 4006, which communicate with each other via a bus 4008. The computer system 4000 may further include a video display unit 4010 (e.g., a liquid crystal display (LCD) or a cathode ray tube (CRT)). The computer system 4000 also includes an alphanumeric input device 4012 (e.g., a keyboard), a user interface (UI) navigation device 4014 (e.g., a mouse), a disk drive unit 4016, a signal generation device 4018 (e.g., a speaker) and a network interface device 4020.

Machine-Readable Medium

The disk drive unit 4016 includes a machine-readable medium 4022 on which is stored one or more sets of instructions and data structures (e.g., software) 4024 embodying or used by any one or more of the methodologies or functions described herein. The instructions 4024 may also reside, completely or at least partially, within the main memory 4004, static memory 4006, and/or within the processor 4002 during execution thereof by the computer system 4000, the main memory 4004 and the processor 4002 also constituting machine-readable media.

While the machine-readable medium 4022 is shown in an example embodiment to be a single medium, the term "machine-readable medium" may include a single medium or multiple media (e.g., a centralized or distributed data store, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 4024 may further be transmitted or received over a communications network 4026 using a transmission medium. The instructions 4024 may be transmitted using the network interface device 4020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 4020 may wirelessly transmit data and may include an antenna.

Global Navigation Satellite System (GNSS) receiver 4046 may receive signals from GNSS satellites, which may be used to calculate the position of the GNSS receiver 4046. The GNSS receiver 4046 may contain all the logic necessary to receive, demodulate, and decode the GNSS signals as well as compute a position using those signals.

The present disclosure supports several examples, including but not limited to the following:

Example 1 includes a method of distributing GNSS correction data, the method comprising receiving, at a server from a first GNSS reference station, a first GNSS correction data message via a first communication link, receiving, at the server from the first GNSS reference station, a second GNSS correction data message via a second communication link, wherein the first communication link is different from the second communication link, comparing a first GNSS message characteristic associated with the first GNSS correction data message to a second GNSS message characteristic associated with the second GNSS correction data message, selecting the second GNSS correction data message based on the comparison; and sending the second GNSS correction data message to the first client.

Example 2 includes the method of example 1, wherein the first GNSS message characteristic is a first GNSS timestamp, the second GNSS message characteristic is a second GNSS timestamp, and selecting the second GNSS correction data message includes determining the second GNSS timestamp is later than the first GNSS timestamp.

Example 3 includes the method of example 1, wherein the first GNSS message characteristic is a first reference station diagnostic, the second GNSS message characteristic is a second reference station diagnostic, and selecting the second GNSS correction data message includes determining, based on comparing the first reference station diagnostic with the second reference station diagnostic, that the second GNSS correction data message includes fewer errors than the first GNSS correction data message.

Example 4 includes the method of any of examples 1-3, wherein the first reference station diagnostic is a first error-detecting code and the second references station diagnostic is a second error-detecting code.

Example 5 includes the method of any of examples 1-3, further including receiving, at the server from a second GNSS reference station, a third GNSS correction data message, comparing the first GNSS message characteristic to a third GNSS message characteristic associated with the third GNSS correction data message, selecting the third GNSS correction data message based on the comparison, and sending the third GNSS correction data message to the first client.

Example 6 includes the method of any of examples 1-5, further including comparing the first GNSS correction data message to the third GNSS correction data message, generating, based on comparing the first GNSS correction data message to the third GNSS correction data message, an inter-station integrity message, sending the inter-station integrity message to the first client.

Example 7 includes a system for communicating GNSS correction data, the system including a correction server configured to receive a first GNSS correction data message via a first communication link from a first GNSS reference station, receive a second GNSS correction data message via a second communication link from the first GNSS reference station, the second communication link being different from the first communication link, compare a first GNSS message characteristic associated with the first GNSS correction data message to a second GNSS message characteristic associated with the second GNSS correction data message, select the second GNSS correction data message based on the comparison, and send the second GNSS correction data message to a client.

Example 8 includes the system of example 7, wherein the first GNSS message characteristic is a first GNSS timestamp, the second GNSS message characteristic is a second GNSS timestamp, and selecting the second GNSS correction data message includes determining the second GNSS timestamp is later than the first GNSS timestamp.

Example 9 includes the system of example 7, wherein the first GNSS message characteristic is a first reference station diagnostic, the second GNSS message characteristic is a second reference station diagnostic, and selecting the second GNSS correction data message includes determining, based on comparing the first reference station diagnostic with the second reference station diagnostic, that the second GNSS correction data message includes fewer errors than the first GNSS correction data message.

Example 10 includes the system of example 7, the correction server further configured to receive a third GNSS correction data message via a third communication link from a second GNSS reference station, compare the first GNSS message characteristic to a third GNSS message characteristic associated with the third GNSS correction data message, select the third GNSS correction data message based on the comparison, and send the third GNSS correction data message to the client.

Example 11 includes the system of any of examples 7-10, the correction server further configured to compare the first GNSS correction data message to the third GNSS correction data message, generate, based on comparing the first GNSS correction data message to the third GNSS correction data message, an inter-station integrity message, send the inter-station integrity message to the first client.

Example 12 includes the system of example 7, the first GNSS reference station further configured to generate the first GNSS message characteristic based on the first GNSS correction data message, and generate the second GNSS message characteristic based on the second GNSS correction data message.

Example 13 includes the system of example 7, wherein the first GNSS message characteristic is a first GNSS reference station diagnostic, the second GNSS message characteristic is a second GNSS reference station diagnostic, and selecting the second GNSS correction data message includes determining, based on the first GNSS reference station diagnostic and on the second GNSS reference station diagnostic, that the second GNSS correction data message is more reliable than the first GNSS correction data message.

Example 14 includes the system of example 7, wherein the second GNSS message characteristic is a second error detecting code, and selecting the second GNSS correction data message further includes determining that the second GNSS correction data message is not faulty based on the second error detecting code.

Example 15 includes a non-transitory computer-readable medium, with instructions stored thereon that are executable by at least one processor of at least one GNSS communication device to cause the at least one GNSS communication device to receive a first GNSS correction data message via a first communication link from a first GNSS reference station, receive a second GNSS correction data message via a second communication link from the first GNSS reference station, the second communication link being different from the first communication link, compare a first GNSS message characteristic associated with the first GNSS correction data message to a second GNSS message characteristic associated with the second GNSS correction data message, select the second GNSS correction data message based on the comparison, and send the second GNSS correction data message to a client.

Example 16 includes the non-transitory computer-readable medium of example 15, wherein the first GNSS message characteristic is a first GNSS timestamp, the second GNSS message characteristic is a second GNSS timestamp, and selecting the second GNSS correction data message includes determining the second GNSS timestamp is later than the first GNSS timestamp.

Example 17 includes the non-transitory computer-readable medium of example 15, wherein the first GNSS message characteristic is a first reference station diagnostic, the second GNSS message characteristic is a second reference station diagnostic, and selecting the second GNSS correction data message includes determining, based on comparing the first reference station diagnostic with the second reference station diagnostic, that the second GNSS correction data message includes fewer errors than the first GNSS correction data message.

Example 18 includes the non-transitory computer-readable medium of any of examples 15-17, wherein the first reference station diagnostic is a first error-detecting code and the second references station diagnostic is a second error-detecting code.

Example 19 includes the non-transitory computer-readable medium of example 15, wherein the instructions further cause the at least one GNSS communication device to receive, at the GNSS communication device from a second GNSS reference station, a third GNSS correction data message, compare the first GNSS message characteristic to a third GNSS message characteristic associated with the third GNSS correction data message, select the third GNSS correction data message based on the comparison, and send the third GNSS correction data message to the client.

Example 20 includes the non-transitory computer-readable medium of any of examples 15-19, wherein the instructions further cause the at least one GNSS communication device to compare the first GNSS correction data message to the third GNSS correction data message, generate, based on comparing the first GNSS correction data message to the third GNSS correction data message, an inter-station integrity message, send the inter-station integrity message to the first client.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to limit the scope of this application voluntarily to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of distributing GNSS correction data, the method comprising:
   receiving, at a server from a first GNSS reference station, a first GNSS correction data message via a first communication link, the first GNSS correction data message including a first GNSS correction data set and a first added information GNSS correction data set, the first GNSS added information GNSS correction data set generated and added to the first GNSS correction data message by the first GNSS reference station;
   receiving, at the server from the first GNSS reference station, a second GNSS correction data message via a second communication link, wherein the first communication link is different from the second communication link, the second GNSS correction data message including a second GNSS correction data set and a second added information GNSS correction data set, the second GNSS added information GNSS correction data set generated and added to the second GNSS correction data message by the first GNSS reference station;
   comparing the first GNSS added information GNSS correction data set to the second GNSS added information GNSS correction data set at the server;
   discarding the first GNSS correction data message based on the comparison;
   selecting the second GNSS correction data message based on the comparison; and
   sending the second GNSS correction data message from the server to a first client.

2. The method of claim 1, wherein:
   the first GNSS added information GNSS correction data set includes a first GNSS timestamp;
   the second GNSS added information GNSS correction data set includes a second GNSS timestamp; and
   selecting the second GNSS correction data message and discarding the first GNSS correction data message includes determining the second GNSS timestamp is later than the first GNSS timestamp.

3. The method of claim 1, wherein:
the first GNSS added information GNSS correction data set includes a first reference station diagnostic;
the second GNSS added information GNSS correction data set includes a second reference station diagnostic; and
selecting the second GNSS correction data message includes determining, based on comparing the first reference station diagnostic with the second reference station diagnostic, that the second GNSS correction data message includes fewer errors than the first GNSS correction data message.

4. The method of claim 3, wherein the first reference station diagnostic is a first Receiver Autonomous Integrity Monitoring (RAIM) diagnostic message and the second references station diagnostic is a second RAIM diagnostic message.

5. The method of claim 3, further including:
receiving, at the server from a second GNSS reference station, a third GNSS correction data message, the third GNSS correction data message including a third GNSS correction data set and a third added information GNSS correction data set, the third GNSS added information GNSS correction data set generated and added to the third GNSS correction data message by the second GNSS reference station;
comparing the second GNSS added information GNSS correction data set to a third GNSS added information GNSS correction data set associated with the third GNSS correction data message;
selecting the third GNSS correction data message based on the comparison; and
sending the third GNSS correction data message to the first client.

6. The method of claim 5, further including:
comparing the second GNSS correction data message to the third GNSS correction data message;
generating, based on comparing the second GNSS correction data message to the third GNSS correction data message, an inter-station integrity message indicating the performance of the second GNSS reference station relative to the first GNSS reference station;
sending the inter-station integrity message to the first client.

7. A system for communicating GNSS correction data, the system including:
a correction server configured to:
receive a first GNSS correction data message via a first communication link from a first GNSS reference station, the first GNSS correction data message including a first GNSS correction data set and a first added information GNSS correction data set, the first GNSS added information GNSS correction data set generated and added to the first GNSS correction data message by the first GNSS reference station;
receive a second GNSS correction data message via a second communication link from the first GNSS reference station, the second communication link being different from the first communication link, the second GNSS correction data message including a second GNSS correction data set and a second added information GNSS correction data set, the second GNSS added information GNSS correction data set generated and added to the second GNSS correction data message by the first GNSS reference station;
compare the first GNSS added information GNSS correction to the second GNSS added information GNSS correction data set;
discarding the first GNSS correction data message based on the comparison;
select the second GNSS correction data message based on the comparison; and
send the second GNSS correction data message to a client.

8. The system of claim 7, wherein:
the first GNSS added information GNSS correction data set includes a first GNSS timestamp;
the second GNSS added information GNSS correction data set includes a second GNSS timestamp; and
selecting the second GNSS correction data message and discarding the first GNSS correction data message includes determining the second GNSS timestamp is later than the first GNSS timestamp.

9. The system of claim 7, wherein:
the first GNSS added information GNSS correction data set includes a first reference station diagnostic;
the second GNSS added information GNSS correction data set includes a second reference station diagnostic; and
selecting the second GNSS correction data message includes determining, based on comparing the first reference station diagnostic with the second reference station diagnostic, that, the second GNSS correction data message includes fewer errors than the first GNSS correction data message.

10. The system of claim 7, the correction server further configured to:
receive a third GNSS correction data message via a third communication link from a second GNSS reference station, the third GNSS correction data message including a third GNSS correction data set and a third added information GNSS correction data set, the third GNSS added information GNSS correction data set generated and added to the third GNSS correction data message by the second GNSS reference station;
compare the second GNSS added information GNSS correction data set to a third GNSS added information GNSS correction data set associated with the third GNSS correction data message;
select the third GNSS correction data message based on the comparison; and
send the third GNSS correction data message to the client.

11. The system of claim 10, the correction server further configured to:
compare the second GNSS correction data message to the third GNSS correction data message;
generate, based on comparing the second GNSS correction data message to the third GNSS correction data message, an inter-station integrity message indicating the performance of the second GNSS reference station relative to the first GNSS reference station;
send the inter-station integrity message to the first client.

12. The system of claim 7, the first GNSS reference station further configured to:
generate the first GNSS added information GNSS correction data set based on the first GNSS correction data message; and
generate the second GNSS added information GNSS correction data set GNSS added information GNSS correction data set based on the second GNSS correction data message.

13. The system of claim 7, wherein:
the first GNSS added information GNSS correction data set includes a first GNSS station diagnostic;
the second GNSS added information GNSS correction data set includes a second GNSS reference station diagnostic; and
selecting the second GNSS correction data message and discarding the first GNSS correction data message includes determining, based on the first GNSS reference station diagnostic and on the second GNSS reference station diagnostic, that the second GNSS correction data message is more reliable than the first GNSS correction data message.

14. The system of claim 7, wherein:
the first GNSS added information GNSS correction data set includes a first error detecting code; and
selecting the second GNSS correction data message and discarding the first GNSS correction data message further includes determining that the first GNSS correction data message is faulty based on the first error detecting code.

15. A non-transitory computer-readable medium, with instructions stored thereon that are executable by at least one processor of at least one GNSS communication device to cause the at least one GNSS communication device to:
receive a first GNSS correction data message via a first communication link from a first GNSS reference station, the first GNSS correction data message including a first GNSS correction data set and a first added information GNSS correction data set, the first GNSS added information GNSS correction data set generated and added to the first GNSS correction data message by the first GNSS reference station;
receive a second GNSS correction data message via a second communication link from the first GNSS reference station, the second communication link being different from the first communication link, the second GNSS correction data message including a second GNSS correction data set and a second added information GNSS correction data set, the second GNSS added information GNSS correction data set generated and added to the second GNSS correction data message by the first GNSS reference station;
compare the first GNSS added information GNSS correction data set to the second GNSS added information GNSS correction data set;
discarding the first GNSS correction data message based on the comparison;
select the second GNSS correction data message based on the comparison; and
send the second GNSS correction data message to a client.

16. The non-transitory computer-readable medium of claim 15, wherein:
the first GNSS added information GNSS correction data set includes a first GNSS timestamp;
the second GNSS added information GNSS correction data set includes a second GNSS timestamp; and
selecting the second GNSS correction data message and discarding the first GNSS correction data message includes determining the second GNSS timestamp is later than the first GNSS timestamp.

17. The non-transitory computer-readable medium of claim 15, wherein:
the first GNSS added information GNSS correction data set includes a first reference station diagnostic;
the second GNSS added information GNSS correction data set includes a second reference station diagnostic; and
selecting the second GNSS correction data message includes determining, based on comparing the first reference station diagnostic with the second reference station diagnostic, that the second GNSS correction data message includes fewer errors than the first GNSS correction data message.

18. The non-transitory computer-readable medium of claim 17, wherein the first reference station diagnostic is a first Receiver Autonomous Integrity Monitoring (RAIM) diagnostic message and the second references station diagnostic is a second RAIM diagnostic message.

19. The non-transitory computer-readable medium of claim 15, wherein the instructions further cause the at least one GNSS communication device to:
receive, at the GNSS communication device from a second, GNSS reference station, a third GNSS correction data message, the third GNSS correction data message including a third GNSS correction data set and a third added information GNSS correction data set, the third GNSS added information GNSS correction data set generated and added to the third GNSS correction data message by the second GNSS reference station;
compare the second GNSS added information GNSS correction data set to a third GNSS added information GNSS correction data set associated with the third GNSS correction data message;
select the third GNSS correction data message based on the comparison; and
send the third GNSS correction data message to the client.

20. The non-transitory computer-readable medium of claim 19, wherein the instructions further cause the at least one GNSS communication device to:
compare the second GNSS correction data message to the third GNSS correction data message;
generate, based on comparing the second GNSS correction data message to the third GNSS correction data message, an inter-station integrity message indicating the performance of the second GNSS reference station relative to the first GNSS reference station;
send the inter-station integrity message to the first client.

* * * * *